US005407582A

United States Patent [19]

Poschmann et al.

[11] Patent Number: 5,407,582
[45] Date of Patent: Apr. 18, 1995

[54] METHOD OF TREATING POWER GENERATING PLANT CONDENSATE

[75] Inventors: Thomas W. Poschmann, Centerport; Barry J. Weissman, Bayville, both of N.Y.

[73] Assignee: Pall Corporation, East Hills, N.Y.

[21] Appl. No.: 142,660

[22] Filed: Oct. 25, 1993

Related U.S. Application Data

[63] Continuation of Ser. No. 876,508, Apr. 30, 1992, abandoned.

[51] Int. Cl.⁶ .............................................. B01D 15/00
[52] U.S. Cl. ...................................... 210/669; 60/646; 122/406.5; 210/505; 210/767; 210/777; 422/14
[58] Field of Search .................. 210/321.87, 488, 489, 210/490, 497.01, 505, 508, 767, 696, 669, 900, 767, 777; 60/646, 657; 122/406.5; 422/1, 10, 14

[56] References Cited

U.S. PATENT DOCUMENTS

| 119,185 | 9/1871 | Selden .................................. 210/669 |
| 2,395,260 | 8/1943 | Farmer et al. ...................... 210/696 |
| 3,194,217 | 7/1965 | Grabowski ....................... 122/406.5 |
| 3,338,053 | 8/1967 | Gorzegno et al. ............... 122/406.5 |
| 4,055,048 | 10/1977 | Reed ..................................... 60/646 |
| 4,594,202 | 6/1986 | Pall et al. ................................. 264/8 |
| 4,726,901 | 2/1988 | Pall et al. ............................. 210/496 |
| 4,882,056 | 11/1989 | Degen et al. ......................... 210/490 |
| 4,904,380 | 2/1990 | Bhanot et al. ....................... 210/193 |
| 5,039,413 | 8/1991 | Harwood et al. ................... 210/457 |
| 5,048,466 | 9/1991 | Rudd ..................................... 60/646 |

OTHER PUBLICATIONS

Publication "Supercritical Boiler Start–Up and Operating Experience", by D. E. Lyons, Combustion Engineering, Inc., Combustion/Dec. 1987.
Pall Filter Guide, "Filtration Technology For Electric Power Generation Systems," Pall Corporation Brochure PGD 150 (1988).
Pall Filter Guide, "Pall Filtration Products in Nuclear Plants," Pall Corporation Brochure PGD 100 (1990).
Pall Filter Guide, "HDC® II Filter Systems For Rapid Condensate Cleanup," Pall Corporation Brochure PGG 450 (1991).
"Hollow Fiber Filter (HFF) In Nuclear Plants," JAIF Expert Mission On Water Chemistry Of Nuclear Reactor Systems (1989).
Liu et al., "Hope Creek Condensate Prefilter Pilot Test Program," EPRI Conference, Filtration of Particulates in LWR Systems (King of Prussia, Pa., Sep. 10–12, 1991).
Hirahara et al., "Operational Experience of Hollow Fiber Filter for Condensate for BWR," JAIF International Conference on Water Chemistry in Nuclear Power Plants (1988).
Takahashi et al., "Operating Experience of Hollow Fiber Filter (HFF) in Fukushima Daiichi Nuclear Power Station," JAIF International Conference on Water Chemistry in Nuclear Power Plants (1991).
Woodard et al., "Non–Precoat Application of Condensate Polishing Systems," EPRI Conference, Filtration of Particulates in LWR Systems (King of Prussia, Pa., Sep. 10–12, 1991).
Publication by C. A. Dauber, "Avon No. 8, A Supercritical Pressure Plant" Aug. 1956 Issue of Combustion, pp. 47–56.

*Primary Examiner*—Joseph W. Drodge
*Attorney, Agent, or Firm*—Leydig, Voit & Mayer, Ltd.

[57] ABSTRACT

A method of treating fossil-fueled power generating plant condensate at start-up by passing the contaminated condensate at start-up of a power generating plant through a filter medium prior to or in the absence of passing the condensate through a precoat or resin bed.

38 Claims, No Drawings

METHOD OF TREATING POWER GENERATING PLANT CONDENSATE

This is a continuation of application Ser. No. 07/876,508 filed on Apr. 30, 1992, now abandoned.

TECHNICAL FIELD OF THE INVENTION

The present invention pertains to a method of treating the condensate of a power generating plant. In particular, the present invention is concerned with reducing the particulate levels of condensed steam used to rotate electric generating turbines in fossil-fueled power plants at start-up after plant shutdowns and outages, so as to protect power plant equipment from scale deposits.

BACKGROUND OF THE INVENTION

In an electric power generation system, high purity feedwater is heated in a boiler to create steam which is then expanded through a steam turbine. The turbine shaft is connected to an electric generator shaft which, when rotated, creates electric energy. The steam that exits the turbine is condensed in a heat exchanger, thereby creating a vacuum. The difference between the steam pressure and the vacuum created is the driving force of the steam through the turbine. The condensed steam may be purified and preheated and is then directed back to the boiler as feedwater, completing the power cycle.

Many electric power generating plants purify condensate to remove contamination, particularly ionic materials from a raw water supply, that may enter the feedwater, steam, or condensate during the power cycle. Such purification is effected by the use of demineralizers to purify the condensate through an ion exchange technique. Two types of demineralizers are used for condensate purification: (i) deep bed demineralizers and (ii) filter demineralizers.

Deep bed demineralizers utilize electrostatically charged resin beads to remove dissolved ions in the condensate. Specifically, the condensate is passed through a bed of resin beads which are retained in a demineralizer vessel. The deep bed demineralizers typically have an effective pore rating on the order of 40–50 microns and are only marginally useful in removing particulates from the condensate.

Filter demineralizers utilize powdered ion exchange resins and/or inert filter aids such as cellulosic fibers which are precoated onto fine porous elements. The porous elements typically include spirally welded metal elements, powdered metal elements, wedge wire elements, and yarn or string wound elements. The condensate is passed through the precoated elements, and the precoated elements remove dissolved contaminates and trap particles. The precoats on the filter demineralizers typically have an effective pore rating on the order of 5–30 microns, with the underlying filter media having a pore rating of 5–120 microns. The filter demineralizers have an overall effective pore rating on the order of 5–30 microns and are therefore somewhat more effective in removing particulates from the condensate as compared to deep bed demineralizers. Solids levels exceeding the relatively low levels of steady-state condensate, e.g., the high solids levels in condensate during start-up and during flow transients associated with load cycling operations, however, lead to the need for extensive backwashing of the precoat resin, with an associated high cost of operation of the filter demineralizers.

The contaminates in feedwater, steam, and condensate in a power generating plant typically must be maintained at a level of no greater than about 50–250 ppb total suspended solids, most typically no more than about 50 ppb total suspended solids. During steady-state operation, the impurities in the condensate are low, and the water quality is typically maintained within the requisite levels through use of deep bed or filter demineralizers. When a unit, particularly a fossil-fueled unit, is shut down for maintenance or for other reasons, however, air enters the equipment previously flooded with water, and iron oxides and other corrosion products form on the carbon steel surfaces of the power generation equipment. Upon plant start-up, the oxide contamination is swept into the boiler feedwater which typically contains at least about 500 ppb total suspended solids, most typically at least about 1000 ppb total suspended solids. The contamination in the feedwater during boiler operation is left behind by the steam and forms into scale on the boiler tubes. This scale reduces boiler efficiency and can eventually lead to boiler tube failure. For that reason, boiler equipment guarantees usually mandate maximum contaminant levels in feedwater prior to boiler operation.

Power generation plants, and, in particular, older fossil-fueled power generation plants, typically have difficulty purifying the condensate to meet requisite levels after unit outages and prior to unit start-up. Plants with condensate purification systems with deep bed demineralizers engage in extended recirculation of the condensate after outages through the condensate purification systems. Since the deep bed demineralizers are not designed to remove particulates, and are therefore inefficient at doing so, extensive recirculation of the condensate is necessary to reduce particulates to the requisite level. The time necessary for recirculation of the condensate to meet the requisite total suspended solids levels typically ranges from about 12 to about 48 hours prior to actual plant start-up, although recirculation times may be as much as about 96 hours.

The use of a filter demineralizer provides for the reduction of particulates in the condensate to the requisite level in about 8 hours, during which time the plant is gradually brought fully on-line. Although only one pass of the condensate is required through a filter demineralizer during start-up, the filter demineralizer is not designed to operate in the high particulate loading environment characteristic of plant start-up, and, therefore, the filter demineralizer frequently clogs during plant start-up. Each time the filter demineralizer becomes clogged, the filter demineralizer must be backwashed, and the precoat must be replaced.

Those plants without any condensate purification system operate the boiler at reduced levels during start-up and attempt to purify the feedwater by blowing down high solids containing water from the boiler steam drum for about 8–10 hours and replacing it with high purity make-up water. In all cases, considerable generating capacity and potential revenue is lost by the additional down-time required to treat the condensate to reduce the contaminant level to the requisite level prior to bringing the plant fully on-line.

There remains a need, therefore, for a method of treating condensate from a power generating plant, particularly a fossil-fueled power generating plant, which can efficiently and economically reduce the contaminant level of the condensate to the requisite level upon start-up after a shut-down period. It is an object of the present invention to provide such a treatment method.

It is another object of the present invention to provide a treatment method which can also be used to continuously treat condensate from a power generating plant during steady-state operation to ensure that the contaminant level of the condensate remains within an acceptably low level.

These and other objects and advantages of the present invention, as well as additional inventive features, will be apparent from the description of the invention provided herein.

BRIEF SUMMARY OF THE INVENTION

The present invention involves a method of treating fossil-fueled power generating plant condensate at start-up by passing the contaminated condensate of a fossil-fueled power generating plant through a filter medium, preferably a filter medium having a 99.98% removal efficiency at about 20 microns or less. The condensate is passed through the filter medium prior to or in the absence of passing the condensate through a precoat or resin bed, such as a deep bed demineralizer or a filter demineralizer. While the condensate of a fossil-fueled power generating plant at start-up will typically contain at least about 500 ppb, and most likely at least about 1000 ppb, total suspended solids, the present inventive method provides for a reduction of the contaminants in the condensate to an acceptable level, e.g., 250 ppb or less, and preferably 100 ppb, 50 ppb, or less, total suspended solids.

DESCRIPTION OF THE PREFERRED EMBODIMENTS

The present invention involves a method of treating the condensate at start-up of the steam of a fossil-fueled power generating plant which is used to turn the turbines of the power plant. During normal, steady-state operation, the condensate becomes contaminated with particulates from the equipment surfaces contacted by the condensate. After a down-time period, however, the condensate becomes significantly more contaminated with particulate matter, especially oxides and the like resulting from the reaction of air with the equipment surfaces. While the particulate level of the condensate at start-up in a fossil-fueled power generation plant will usually be at least about 500 ppb total suspended solids, and more typically at least about 1000 ppb total suspended solids, the condensate, for proper power plant operation, generally must contain 250 ppb or less, usually 100 ppb or less, and preferably 50 ppb or less, total suspended solids prior to full start-up of the power generating plant.

The present invention is directed toward treating the condensate to efficiently and economically reduce the contaminants to an acceptable level in the condensate upon start-up. The present invention is also useful in ensuring that the contaminant level remains at an acceptable level after start-up and during steady-state operation.

The present inventive method of treating the condensate of a fossil-fueled power generating plant comprises passing the contaminated condensate at start-up of a fossil-fueled power generating plant through a filter medium prior to or in the absence of passing the condensate through a precoat or resin bed so as to reduce the level of contaminants in the condensate to an acceptable level, generally about 250 ppb or less total suspended solids, preferably about 100 ppb or less total suspended solids, and most preferably about 50 ppb or less total suspended solids.

The filter medium may be any suitable filter medium, such as a metal membrane filter similar to the PMM ® filter medium, a glass fiber filter similar to the Ultipor GF ® filter medium, a continuous fiber, nonwoven filter similar to a HDC ® or Profile ® filter medium, a sintered powder stainless steel filter similar to a PSS ® filter medium, a stainless steel woven wire mesh filter similar to a Rigimesh ® or Supramesh ® filter medium, or a stainless steel sintered fibrous filter similar to a PMF ® filter medium (all available from Pall Corporation). The filter medium preferably comprises a nonwoven web of fibers and most preferably comprises fibers which have been melt-blown, layered, and secured onto a suitably pervious substrate, such as the HDC ® and Profile ® filter media (Pall Corporation). U.S. Pat. Nos. 4,594,202 and 4,726,901 disclose such filter media and are incorporated in their entireties herein by reference.

The fibers of the filter medium may be prepared from any suitable organic material, such as nylon, fluoropolymer, polypropylene, polyethylene, polyester, polystyrene, and polyurethane resin, or from inorganic materials, such as glass, carbon, aluminum, and stainless steel. The filter medium preferably is prepared from polypropylene fibers layered onto a polypropylene support or from polyester fibers layered onto a polyester support. The filter medium is most preferably of a polypropylene construction, which is relatively inexpensive and resistant to a wide variety of contaminants.

The filter medium will usually have a 99.98% removal efficiency at no greater than about 20 microns, e.g., 15, 10, 5, or less microns. The filter medium preferably has a 99.98% removal efficiency at about 10 microns or less, more preferably at about 6 microns or less, and most preferably at about 5–6 microns. The most preferred filter medium also preferably has a 90% removal efficiency at about 3 microns or less. At higher pore ratings, the filter medium will not reduce the contaminant level of the condensate to a appropriately low level, while at lower pore ratings, the filter medium will exhibit an undesirably high pressure drop.

The removal efficiency of the filter medium is determined herein by the OSU-F2 test, also known as the beta rating system. Specifically, for data in the 0.5 to 25 $\mu$m range, a standardized silicious contaminant, AC Fine Test Dust, is prepared as a stable suspension in water at a preset concentration, and the suspension is pumped at 5 gpm/sq. ft. through the filter element. For data in the 25 to 90 $\mu$m range, a military standard oil with a viscosity of 10 centipoise is used with a standardized silicious contaminant, AC Coarse Test Dust, and the suspension is pumped at 10 gpm/sq. ft. through the filter element. The test system is equipped with an upstream and a downstream particle counter to count the amount of contaminant of particular diameters upstream and downstream of the filter medium, and these counts are used to determine the removal efficiencies with respect to particular contaminant diameters. Simultaneously with the efficiency measurements, the pressure drop across the filter element is measured. The quantity of incident standard contaminant required to develop a pressure of 40 psi across the filter element is reported herein as the dirt capacity of the filter element.

The filter medium used in the context of the present inventive method may also be appropriately charge modified to increase its efficiency in removing particulates. A desirable charge modification will depend on the specific nature of the condensate and the contaminants therein.

The filter medium may have any suitable overall structure. The filter medium, for example, may be flat or pleated, and may be configured into a square, oblong, or circular design. The filter medium is preferably of a long, cylindrical, open core design, with the condensate flowing from outside the filter medium toward the open core and out an open end of the filter medium.

The filter medium will not be used with a resin precoat and preferably does not include any type of precoat. In addition, the filter medium is preferably disposable, and, therefore, need not be backwashable.

The filter medium may employ any suitable pore structure. The filter medium preferably has a graded or tapered pore structure such that the pores of the filter medium decrease in size in the direction of normal fluid flow. With the preferred cylindrical tube configuration for the filter medium and usual fluid flow, the pores of the filter medium preferably decrease in size from the perimeter of the filter medium toward the center of the filter medium.

The filter medium will be typically used in a suitable element or housing and may additionally employ layers for support, drainage, and the like. For example, the filter medium may be surrounded by a metal mesh to provide additional support and protection for the filter medium, particularly if the filter element is to be subjected to backwashing.

The present invention may be used to treat condensate at any acceptable flow rate, consistent with the overall design of the system. Generally, the condensate will pass through the filter medium in the context of the present invention at a flow rate which is less than the steady-state condensate flow rate usually employed in the power generating plant. Such start-up condensate flow rates will typically be less than 50%, and more typically, less than 33%, of the steady-state condensate flow rate.

The present invention can be used either in conjunction with or without a deep bed and filter demineralizer as conventionally used in power generating plants, although, if used in conjunction with a deep bed or filter demineralizer, the filter medium in the context of the present invention, is placed upstream of the deep bed or filter demineralizer. In other words, the condensate is passed through the filter medium in the context of the present invention either prior to or in the absence of passing the condensate through a precoat or resin bed. The treatment of condensate in accordance with the present invention prior to passage of the condensate through a deep bed or filter demineralizer has the benefit of ensuring that the demineralizers are not adversely contaminated with too high a level of particulates, which would reduce the efficiency of the demineralizers and prematurely require their regeneration or replacement.

The present invention is preferably used with such demineralizers in reducing the contaminant level of condensate during start-up. While the present invention is particularly directed toward reducing the contaminants in condensate during start-up, the present invention may also be used during steady-state operation to ensure the requisite low level of contaminants and minimize the need to replace or regenerate any demineralizers being used in the power generating plant.

The following examples further illustrate the present invention but, of course, should not be construed as in any way limiting its scope.

EXAMPLE 1

The conventional treatment of condensate at an actual power generating plant upon start-up was examined and compared with the results expected from the use of the present inventive method.

The power generating plant is a supercritical coal fueled power plant wherein condensate polishing is performed by a system comprising three deep bed demineralizers. At steady-state operation, the system functions at a fluid flow rate of 6000 gpm.

During the start-up of the power generating plant, condensate contaminant level reduction is accomplished by recirculation of the condensate through the deep bed demineralizers at 1700 gpm, while idled components of the condensate system are brought on-line in stages. Deep bed effluent at or below 250 ppb total suspended solids is required prior to firing the boiler, and a 12–48 hour delay of power production is normally required to reach such a low contaminant level.

The specific start-up procedure for the power generating plant is as follows:

(1) The heat transfer tubes of the condenser are submerged by flooding with condensate.

(2) The condenser is drained to an operable level by using the condensate feed pumps to circulate water to the condensate storage tank.

(3) Water is recirculated from the condenser to the condensate feed pumps and back to the condenser. This step mobilizes the corrosion products formed during the down-time of the plant.

(4) The water is recirculated via the condensate feed pumps to the deaerater, to the condenser, and back to the feed pumps. This step begins the slow heat-up of the condensate to 250° F. Total suspended solids reach peak level at this stage.

(5) The deep bed demineralizers are brought on-line. The flow of water now proceeds from the condensate feed pumps to the deep bed demineralizers, to the deaerater, to the condenser, and back to the feed pumps. This step begins the clean-up of the water used to purge the idled plant components.

(6) The condensate is recirculated via the condensate feed pumps through the deep bed demineralizers, the deaerater, the feedwater pumps, the feedwater heaters, the condenser, and back to the condensate feed pumps.

(7) The unfired boiler is flushed with condensate when the total suspended solids level of the condensate falls below 250 ppb. The condensate is then recirculated via the condensate feed pumps through the deep bed demineralizers, the deaerater, the feedwater pumps, the feedwater heaters, the boiler, the condenser, and back to the condensate feed pumps.

(8) After an initial surge in total suspended solids at the time the boiler is flushed, the deep bed demineralizers return the contaminant level of the condensate to 250 ppb or less total suspended solids. The contaminant level having been so reduced, the boiler can be fired for steam production.

During the start-up of the power generating plant, sampling of the condensate was carried out spanning steps 2–6 above. The total suspended solids peaked at 3.8 ppm after the deaerater was brought on-line in step 4 at about 20 hours into the start-up procedure. An additional 7 hours were required to reduce the contaminant level to 340 ppb as measured as influent to the deep bed demineralizers. During the course of start-up, the removal efficiency of the deep bed demineralizers declined from 80% to 29% by weight. The recirculative return of previously passed solids and/or saturation of electrostatically active sites on the resin surface may have contributed to this decline. More than 94% of the particles ingressing the deep bed demineralizers were less than 10 microns.

Based upon the particle count data and experience with filters of the type to be used in conjunction with the present invention, the use of the present invention is expected to significantly shorten the start-up time for this power generating plant. In particular, a filter medium having a tapered pore configuration and a 99.98% removal efficiency at about 6 microns is expected to result in a ten-fold reduction in recirculative system clean-up time and also reduce the frequency of regeneration of the deep bed demineralizers during steady-state operation.

EXAMPLE 2

The conventional treatment of condensate at another actual power generating plant upon start-up was examined and compared with the results expected from the use of the present inventive method.

The power generating plant is a supercritical natural gas fueled power plant wherein condensate polishing is performed by a system comprising four deep bed demineralizers. At steady-state operation, the system functions at a fluid flow rate of 7000 gpm.

During the start-up of the power generating plant, condensate contaminant level reduction is accomplished by recirculation of the condensate through the deep bed demineralizers at 900 gpm, while idled components of the condensate system are brought on-line in stages. Deep bed effluent at or below 250 ppb total suspended solids and at or below 50 ppb total suspended iron is required prior to firing the boiler, and a 12–96 hour delay of power production is normally required to reach such a low contaminant level.

Condensate clean-up occurs in four phases corresponding to progressively larger recirculation loops:

(1) The condensate recirculation phase involves the flow path of condenser, condensate feed pumps, condensate coolers, deep bed demineralizers, hydrogen coolers, gland seal cooler, and back to the condenser. The total suspended solids level is not critical to initiating phase 2.

(2) The deaerater warm-up phase involves the flow path of phase 1 with the addition of the condensate booster pumps, feed water heaters, and deaerater after the gland seal cooler and prior to the return to the condenser. The total suspended solids level must be reduced to at least 250 ppb prior to initiating phase 3.

(3) The pre-boiler clean-up phase involves the flow path of phase 2 with the addition of boiler feedwater pumps, feedwater heaters, secondary pumps, and feedwater heaters after the deaerater and prior to the return to the condenser. The total suspended solids level must be reduced to at least 250 ppb, with no more than 50 ppb total suspended iron, prior to initiating phase 4.

(4) The boiler through-flow phase involves the flow path of phase 3 with the addition of economizer, boiler recirculation pumps, and boiler start-up separator after the feedwater heaters and prior to the return to the condenser.

The deep bed demineralizers are rotated in and out of service during the start-up procedure based upon total suspended solids breakthrough, judged by visual color interpretation of analysis membranes.

Sampling of the condensate was initiated 25.75 hours into phase 1 and was carried out spanning phases 1–4 above. The total suspended solids averaged at about 500 ppb after initiation of phases 1–3 and peaked at 6.34 ppm upon the initiation of boiler through-flow in phase 4. More than 95% of the particles ingressing the filter demineralizers were 10 microns or less. An analysis of the suspended solids revealed that most of the suspended solids were iron oxide particles.

Based upon the particle count data and experience with filters of the type to be used in conjunction with the present invention, the use of the present invention is expected to significantly shorten the start-up time for this power generating plant. In particular, a filter medium having a tapered pore configuration and a 99.98% removal efficiency at about 5 microns is expected to result in a ten-fold reduction in recirculative system clean-up time and also reduce the frequency of regeneration of the deep bed demineralizers during steady-state operation.

While this invention has been described with an emphasis upon preferred embodiments, it will be obvious to those of ordinary skill in the art that variations in the preferred method may be used and that it is intended that the invention may be practiced otherwise than as specifically described herein. Accordingly, this invention includes all modifications encompassed within the spirit and scope of the invention as defined by the following claims.

What is claimed is:

1. A method of treating fossil-fueled steam generating plant condensate at start-up, which method comprises passing contaminated condensate at start-up of a fossil-fueled steam generating plant through a filter medium having an upstream side and a downstream side prior to or in the absence of passing said condensate through a precoat or resin bed so as to reduce the total suspended solids of said condensate to about 250 ppb or less, wherein the filter medium removes 99.98% of the total suspended solids in the condensate of a selected solids particle size and 90% of the total suspended solids in the condensate of a selected smaller solids particle size, while maintaining a pressure drop across the filter medium of no more than 40 psi while the contaminated condensate is passed through the filter medium.

2. The method of claim 1, wherein said condensate contains at least about 500 ppb total suspended solids at start-up.

3. The method of claim 2, wherein said condensate contains at least about 1000 ppb total suspended solids at start-up.

4. The method of claim 3, wherein said condensate is passed through said filter medium so as to reduce the total suspended solids of said condensate to about 100 ppb or less.

5. The method of claim 4, wherein said condensate is passed through said filter medium so as to reduce the total suspended solids of said condensate to about 50 ppb or less.

6. The method of claim 4, wherein said filter medium has a 99.98% removal efficiency at about 20 microns or less.

7. The method of claim 6, wherein said filter medium has a 99.98% removal efficiency at about 10 microns or less.

8. The method of claim 7, wherein said filter medium is a nonwoven filter medium.

9. The method of claim 8, wherein said filter medium has a tapered pore distribution such that said pores decrease in size from said upstream side to said downstream side of said filter medium.

10. The method of claim 9, wherein said filter medium comprises fibers of a material selected from the group consisting of polypropylene and polyester.

11. The method of claim 10, wherein said filter medium comprises polypropylene fibers.

12. The method of claim 9, wherein said steam generating plant is an electric power generating plant.

13. The method of claim 7, wherein said filter medium has a 99.98% removal efficiency at about 6 microns or less.

14. The method of claim 13, wherein said filter medium has a 90% removal efficiency at about 3 microns or less.

15. The method of claim 13, wherein said steam generating plant is an electric power generating plant.

16. The method of claim 7, wherein said steam generating plant is an electric power generating plant.

17. The method of claim 4, wherein said steam generating plant is an electric power generating plant.

18. The method of claim 3, wherein said condensate is passed through said filter medium at a flow rate less than the steady-state flow rate of said condensate after start-up.

19. The method of claim 1, wherein said steam generating plant is an electric power generating plant.

20. A method of treating fossil-fueled steam generating plant condensate at start-up, which method comprises passing the condensate containing at least about 1000 ppb total suspended solids at start-up of a fossil-fueled steam generating plant through a nonwoven filter medium having an upstream side and a downstream side, having a tapered pore distribution such that said pores decrease in size from said upstream side to said downstream side of said filter medium, and having a 99.98% removal efficiency at about 6 microns or less and a 90% removal efficiency at about 3 microns or less prior to or in the absence of passing said condensate through a precoat or resin bed so as to reduce the total suspended solids of said condensate to about 100 ppb or less.

21. The method of claim 20, wherein said filter medium comprises fibers of a material selected from the group consisting of polypropylene and polyester.

22. The method of claim 21, wherein said filter medium comprises polypropylene fibers.

23. The method of claim 22, wherein said condensate is passed through said filter medium at a flow rate less than the steady-state flow rate of said condensate after start-up.

24. The method of claim 23, wherein said steam generating plant is an electric power generating plant.

25. The method of claim 20, wherein said steam generating plant is an electric power generating plant.

26. A method of treating fossil-fueled steam generating plant condensate at start-up, which method comprises passing contaminated condensate at start-up of a fossil-fueled steam generating plant through a filter medium having an upstream side and a downstream side and a 99.98% removal efficiency at about 6 microns or less and a 90% removal efficiency at about 3 microns or less prior to or in the absence of passing said condensate through a precoat or resin bed so as to reduce the total suspended solids of said condensate to about 250 ppb or less.

27. The method of claim 26, wherein said condensate contains at least about 500 ppb total suspended solids at start-up.

28. The method of claim 27, wherein said condensate contains at least about 1000 ppb total suspended solids at start-up.

29. The method of claim 28, wherein said condensate is passed through said filter medium so as to reduce the total suspended solids of said condensate to about 100 ppb or less.

30. The method of claim 29, wherein said condensate is passed through said filter medium so as to reduce the total suspended solids of said condensate to about 50 ppb or less.

31. The method of claim 28, wherein said condensate is passed through said filter medium at a flow rate less than the steady-state flow rate of said condensate after start-up.

32. The method of claim 26, wherein said filter medium is a nonwoven filter medium.

33. The method of claim 32, wherein said filter medium has a tapered pore distribution such that said pores decrease in size from said upstream side to said downstream side of said filter medium.

34. The method of claim 33, wherein said filter medium comprises fibers of a material selected from the group consisting of polypropylene and polyester.

35. The method of claim 34, wherein said filter medium comprises polypropylene fibers.

36. The method of claim 34, wherein said steam generating plant is an electric power generating plant.

37. The method of claim 33, wherein said steam generating plant is an electric power generating plant.

38. The method of claim 26, wherein said steam generating plant is an electric power generating plant.

* * * * *